United States Patent

[11] 3,603,860

| [72] | Inventor | Paul J. Johnson<br>15970 Allen Rd., Milan, Mich. 48160 |
|---|---|---|
| [21] | Appl. No. | 844,368 |
| [22] | Filed | July 24, 1969 |
| [45] | Patented | Sept. 7, 1971 |

[54] AUTOMATIC BATTERY CHARGER
2 Claims, 7 Drawing Figs.

[52] U.S. Cl. .................................................. 320/2,
248/124, 320/59, 339/10, 339/119
[51] Int. Cl. ................................................. H02j 7/00
[50] Field of Search ........................................... 320/2, 314,
5, 14, 57, 59, 56; 248/124; 339/10, 119; 356/121,
122

[56] References Cited
UNITED STATES PATENTS

| 2,565,273 | 8/1951 | Shuler et al. .................... | 320/2 |
| 2,966,248 | 12/1960 | Armbruster ..................... | 320/2 |
| 3,013,198 | 12/1961 | Witte et al. ...................... | 320/2 |
| 3,067,373 | 12/1962 | Hopt et al. ...................... | 320/2 |
| 3,105,929 | 10/1963 | Blue ............................... | 320/2 |
| 3,273,038 | 9/1966 | Miller ............................. | 320/2 |
| 3,409,816 | 11/1968 | Foster ........................... | 320/2 |
| 2,176,214 | 10/1939 | Falge et al. ..................... | 356/122 |
| 2,540,841 | 2/1951 | Stancu ............................ | 320/59 X |
| 3,270,267 | 8/1966 | Nolte, Jr. ........................ | 320/56 |
| 3,513,435 | 5/1970 | Degaetano .................... | 339/42 |

FOREIGN PATENTS

| 629,897 | 8/1956 | Canada ........................... | 320/2 |
| 1,118,327 | 11/1961 | Germany ........................ | 320/2 |

*Primary Examiner*—J. D. Miller
*Assistant Examiner*—John M. Gunther
*Attorney*—Edward M. Apple

ABSTRACT: This application discloses an automatic battery charger for use with an electric automobile, golf cart, or any vehicle using a storage battery. The invention resides in the particular combination and arrangement of elements particularly a structure embodying a fixed male charging section, and a portable female section, which is carried on the vehicle. The sections being brought into mating and charging relation when the vehicle is moved into a certain position, and the sections being disconnected when the vehicle is moved away from that position.

PATENTED SEP 7 1971
3,603,860
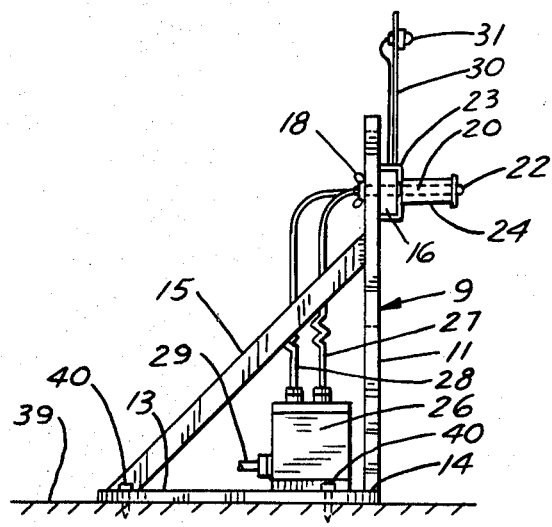
FIG. 2
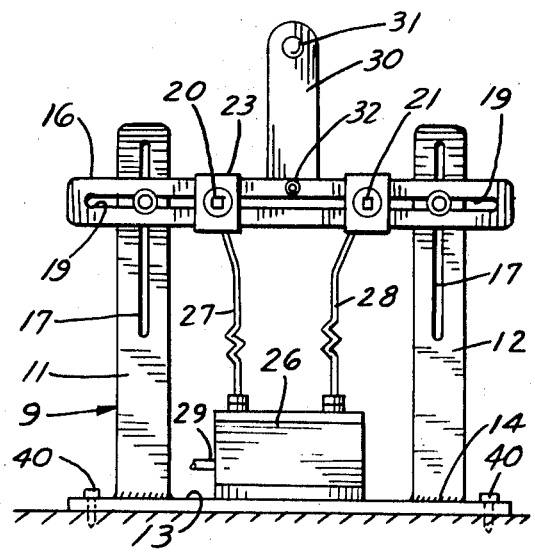
FIG. 3
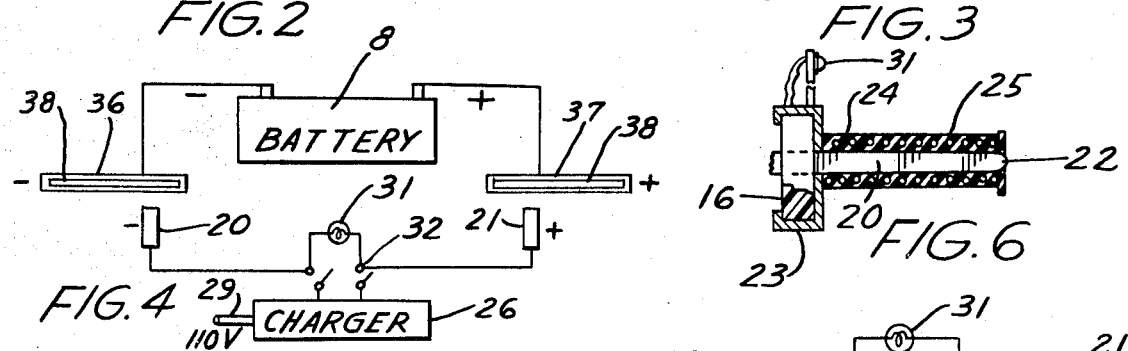
FIG. 4    FIG. 6
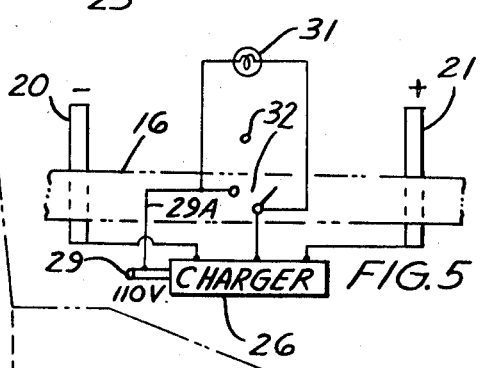
FIG. 5
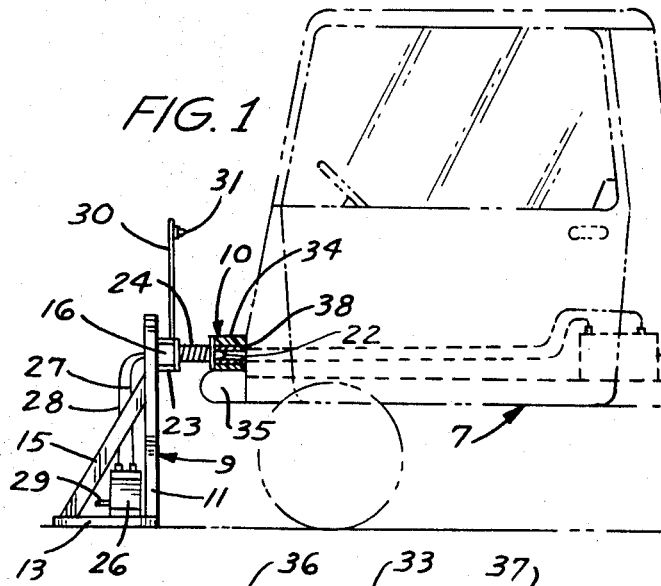
FIG. 1
FIG. 7
INVENTOR.
PAUL J. JOHNSON
BY Edward M. Apple
ATTORNEY

AUTOMATIC BATTERY CHARGER

This invention relates to the art of charging storage batteries such as used in electric automobiles, golf carts, scooters, hoists and the like, and particularly to an automatic device for effecting the charging of the batteries.

An object of the invention is to provide an automatic battery-charging system which is simple in construction, economical to manufacture and install and one which is highly efficient in operation.

Another object of the invention is to provide a battery-charging system which may be used with any type of vehicle employing a storage battery, including a conventional gasoline or Diesel-operated vehicle.

Another object of the invention is to provide a system of the character indicated, a section of which is installed in a garage, warehouse, factory or other permanent structure, and another section of which is carried on the vehicle using the battery or batteries.

Another object of the invention is to provide a battery-charging system which is automatically set in charging condition by making electrical contact between the battery-carrying vehicle and a fixed portion of the system.

The foregoing and other objects and advantages of the invention will become more apparent as the description proceeds, reference being made from time to time to the accompanying drawing, forming part of the within disclosure, in which drawing:

FIG. 1, is a side-elevational view of a vehicle having a storage battery which is being charged by a device embodying the invention.

FIG. 2, is an enlarged detail, in side elevation, illustrating the male portion of the device shown in FIG. 1.

FIG. 3, is an enlarged front elevation of the male portion of the device shown in FIG. 2.

FIG. 4, is a schematic view of a typical electrical circuit employed with the device.

FIG. 5, is a modified form of circuit.

FIG. 6, is an enlarged section taken through one of the electrode assemblies.

FIG. 7, is an enlarged front elevational view of a vehicle bumper, which is equipped with the female portion of the device.

Referring now, more particularly to the drawing, it will be understood that in the embodiment herein disclosed, the reference character 7 indicates, in general, a vehicle which is provided with a storage battery 8, which is being charged by the device embodying the invention. The invention device, FIG. 1, consists of a male section 9, and a female section 10.

The male section 9, FIGS. 2 and 3, consists of a pair of upright members 11 and 12, which are preferably made of metal, and which are secured to a comparatively heavy baseplate 13 by welding 14, or other suitable means. The uprights 11 and 12 are reinforced with angular braces 15, which are secured in place, as shown in FIG. 2. Horizontally positioned on the uprights 11 and 12 is a crossmember 16, which is preferably made of high impact styrene, or other suitable nonconductive material. The upright members 11 and 12 are slotted, as at 17, so that the crossmember 16 may be vertically adjusted on the vertical members 11 and 12. The crossmember 16 is held in various positions of vertical adjustment by means of bolts and wing nuts 18.

The crossmember is slotted, as at 19, in which slot is slidably positioned a pair of electrodes 20 and 21. The electrodes 20 and 21 are preferably made of copper, or other suitable conductive material and are pointed as at 22, so that they may easily be received in the female portion of the device as hereinafter described.

Each of the electrodes 20, 21, FIG. 6, is held in position on the cross member 16 by means of C members 23, and are insulated throughout their length by means of compressible rubber sleeves, which hive imbedded in their walls the expansion springs 25. The rubber sleeves 24 are a safety factor, which prevent anyone from being shocked or burned should he come in contact with the two electrodes inadvertently. The electrodes 20 and 21 are slideably adjustable on the crossmember 16 and the crossmember 16 is vertically adjustable on the upright members 11 and 12, so that the device may be adjusted to accommodate various heights and widths of vehicles.

Each of the electrodes 20 and 21 is connected to the poles of a battery charger 26, as at 27 and 28. The battery charger 26, in turn, is connected to a 110-volt power source as at 29. The crossmember 16 is provided with a centrally disposed upright panel 30, which carries a pilot light 31, which, in turn, is electrically connected to a switch 32, FIGS. 3, 4 and 5, which, in turn, is connected to the electrodes 20 and 21 through a suitable circuit as shown in FIGS. 4 and 5.

The structure just described constitutes the male portion of the device.

The female portion of the device is either made an integral part of a vehicle bumper 33, as shown in FIG. 7, or may be a dielectric fitting 34, positioned on top of the vehicle bumper 35, as shown in FIG. 1. In either event, the bumper 33, or the fitting 34 is provided with a pair of slots 36 and 37, in each of which, is mounted a pair of conductive members 38, which are arranged to receive between each pair of conductive members 38, one of the electrodes 20, 21, in order to complete the circuit between the charger 26 and the storage battery 8.

In the circuit shown in FIG. 4, I use a double pole switch 32, and in FIG. 5 I show a single pole switch 32, one side of which is connected to the 110-volt power input line, as at 29A. In the first circuit shown in FIG. 4, the charger 26 is always energized, whereas in the circuit, FIG. 5, the charger 26 is only energized when the switch 32 is closed.

In FIGS. 1, 2 and 3, I show the charger 26 as being installed on the plate 13 which makes it easy to move the mile portion of the device from one place to another, although I show the device in FIGS. 2 and 3 as being secured to the floor 39, by means of leg screws 40. Although I have disclosed the male section of the device as being portable, it will be understood that the uprights 11 and 12 and the crossmember 16 may be permanently installed against the wall of a garage or factory, or the like, in which event the charger 26 would also be permanently secured to the wall.

In operating the device, the male portion, as previously described, is first secured to the floor, or to a side wall of a garage, or the like, and the arm 16 and electrodes 20 and 21 are adjusted so the electrodes will readily mate with the female portion of the device carried on the vehicle. The vertical adjustment of the cross member 16 will accommodate the male portion to the height of the female portion as carried by the vehicle and the lateral adjustment of the electrodes 20 and 21 will provide proper mating of the male and female elements even though the vehicle 7 carrying the female portion may not be positioned exactly in the same place on various drives into the garage.

When the vehicle is driven into the garage and the male and female portions are brought into contact, the pilot light 31 will be energized as soon as the bumper of the vehicle touches the switch 32 to energize the charger.

Referring now more particularly to FIG. 6, it will be understood that the rubber sleeves 24 will be compressed by the vehicle bumper as shown in FIG. 1 to bare the electrodes 20 and 21 for making proper electrical contact when the vehicle carrying the female portion makes contact with the sleeves 24. The sleeves 24 continue to be compressed until the bumper of the vehicle strikes the switch 32, which also serves as a stop for the forward motion of the vehicle. It will be understood that the charger 26 is provided with a voltage regulator so that the battery 8 may not be overcharged. When the vehicle 7 is backed away from the male portion 9, the switch 32 will open to break the circuit to the battery, and at the same time, the sleeves 24 will expand to cover the electrodes 20 and 21.

With a device such as hereinabove described, a vehicle owner may always keep his battery charged to full capacity automatically.

Having described my invention, what I claim and desire to secure by Letters Patent is:

1. The combination, with a highway-traveling motor vehicle having a storage battery, of a battery-charging system, comprising a fixed portion, including a battery charger in circuit with a pair of elevated male electrodes, each of which is normally covered with a spring-biased, slideable, insulating means, a portable portion including a pair of female elements for receiving said male electrodes, and in circuit with the said storage battery, the fixed portion being normally removed from said vehicle and said portable portion being carried by said vehicle, and electric elements, including a switch, arranged to be closed to conduct current through said battery charger to said battery when said male and female electrodes are properly mated, the said switch being arranged to be closed by the forward movement of said vehicle and said switch being arranged to be opened when said vehicle is moved in a reverse direction, the said fixed portion having vertically and horizontally adjustable members for supporting said male electrodes.

2. The structure of claim 1, in which said fixed portion includes a base member, which supports said charger, a pair of upright members secured to said base member and a nonconductive crossmember vertically adjustable on said uprights, said male electrodes being carried by crossmember and being laterally adjustable on said cross member and vertically adjustable by said uprights.